3,156,557
PROCESS OF PRODUCING METALS FROM METAL OXIDES

Erik Dahl and Sigmund Okstad, Vagsbygd, near Kristiansand, and Hans Skretting, Kristiansand, Norway, assignors to Elektrokemisk A/S, Oslo, Norway, a corporation of Norway
No Drawing. Filed Sept. 26, 1961, Ser. No. 140,663
Claims priority, application Norway Oct. 4, 1960
10 Claims. (Cl. 75—4)

This invention relates to a method of making preformed aggregates of considerable strength from ore bodies and carbonaceous binders. These aggregates are the type used in the production of metals or carbides. Generally speaking the invention is used with ore bodies that can be reduced with carbon and particularly ore bodies containing iron oxide with or without alloying ingredients such as manganese or chrome, and calcium compounds used in making calcium carbide.

It is known in the art to make such aggregates comprising the ore together with the carbonaceous reducing agent and a flux. This form of aggregate is very favorable for dry reduction in the solid phase. When we refer to aggregates we include briquettes or extruded pieces but more generally the aggregates are in the form of pellets or small balls made by mixing the ingredients with water and rolling them in a drum or on inclined plates or saucers. The crude pellets thus obtained initially are not very strong having a point pressure strength of about 3 to 5 kg. and a drop strength range from about 50 cm. up to about 150 cm. The term "drop strength" means the height in cm. from which a number of pellets can be dropped onto a steel plate without more than half of them being broken. If aggregates are formed of simple iron ore fines considerable strength can be obtained by sintering the aggregates at a temperature from 1200–1300° C. but if carbon is included such sintering in air or other oxidizing atmospheres causes considerable loss of carbon and this is a substantial factor in computing the cost of the operation.

The addition of cement to the aggregates gives an improved strength after storage for a few days and the pellets are adequately strong at lower temperature ranges. However, when these pellets are used and heated the cement tends to disintegrate and lose strength when the temperature of the pellets goes above about 400° C.

This invention is based upon our discovery that aggregates can be formed by combining the finely ground ore with powdered coal of very particular coking qualities and then forming the aggregates with a hydraulic cement. In such case the aggregates will harden in a few days to give them adequate strength for storage and shipment. Subsequently when the aggregates are used in a preheating or prereduction operation we find that as the temperature approaches the point (above about 400° C.) where the cement begins to lose its binding power, the particular coal that we employ will begin to coke and form a lattice of considerable strength. As a result instead of the pellets weakening as they are heated the strength of the pellets increases at higher temperatures and disintegration of the pellets is largely avoided.

The coking qualities of coal are measured by ASTM Designation D720–43T and are reported in arbitrary numbers under such test ranging from 1 to 10. This is known as the swelling index. For the purpose of our invention we find that we should use a coal having a swelling index of above 4 and preferably an index of 8 or higher. Coal with a normal swelling index of 4.5 used by itself only just gives the minimum strength required. However, the addition of about ½% to about 2% of pitch has the effect of raising the swelling index and by adding such pitch we may use coals which by themselves have a swelling index as low as about 3. However, it is desired that the bituminous compound (by which we mean the coal and the pitch if any is used) should have a swelling index of at least 7 and preferably 8 or higher.

In carrying out the invention the finely ground ore is mixed with separately ground coal. If pitch is included that should be ground with the coal. The amount of coal will be adjusted to give the desired carbon for the reduction reaction and the fact that the coal also serves to form a coke binder does not demand a change in the usual carbon requirements. The combination of the ore and bituminous material is mixed with from 3 to 10% of a water-activatable hydraulic binder such as Portland cement, a cement rich in Al-oxide, or a cement produced on a base of granulated blast furnace slag. Usually about 5% of the hydraulic binder is about right. The ore, coal and binder are preferably mixed, dried and then as usual water is added during the pelletizing. Ordinarily it will be sufficient to have present in the neighborhood of about 10% total moisture.

The crude pellets thus formed should have an initial point pressure strength of at least about 3 kg. and after storing for a few days and hardening this should reach 15 kg. and preferably 20 kg. If such pellets are then heated to about 700° C. in a neutral atmosphere it will be found that instead of their strength falling off as is usual with cement hardened pellets such strength will greatly increase.

This invention is illustrated in the following table in which the first two examples show the falling off of strength on heating when one uses the usual coal with a low swelling index. The third example shows a substantial increase in strength and the last three examples are excellent.

| Reducing Agent | Portland Cement, percent | Pitch | Swelling Index | Pressure Strength (point kg. load) Drop Height, cm. | Crude Pellets | Stored 3 Days | Hardened 700° C. |
|---|---|---|---|---|---|---|---|
| Methil washed singles | 5 | 0 | 1 | Pressure drop | 4.15 / 150 / 3.5 | 11.6 / 200 / 15.3 | 7.2 / 45 / 9.2 |
| Do | 5 | 1 | 1 | do | 155 / 3.9 | 160 / 19.0 | 75 / 64 |
| Pocahontas coal | 5 | 0 | 4.5 | do | 145 / 4.0 | 215 / 23.4 | 190 / 141 |
| Do | 5 | 1 | 7.0 | do | 145 / 4.4 | 230 / 16.6 | 300 / 109 |
| Belgian coal | 5 | 0 | 8 | do | 180 / 3.7 | 230 / 27 | 300 / 180 |
| Longyear coal | 5 | 0 | 8.5 | do | 125 | 250 | 300 |

It appears from the table that coal with a swelling index of 1 gives poor strength both after storing and hardening at 700° C. Even with addition of pitch the requirements for proper quality are not satisfied.

Coal with a swelling index 4.5 gives considerably better strength but only just up to that required. By addition of pitch, whereby the swelling index is increased from 4.5 to 7, a very satisfactory strength is obtained. Coal with a swelling index of 8 and 8.5 will give a good strength in the pellets without addition of pitch.

Charge pellets produced according to the invention can after a few days' storage be smelted directly in a blast furnace, low shaft furnace or electric furnace without any special sintering operation. As mentioned above our charge pellets are especially suited for preheating and prereduction in the temperature range of 700–1000° C. with subsequent transfer of the hot charge to an electric furnace without intentional cooling. In the electric furnace the reduction is completed and also the smelting of the reaction products under formation of metal and slag.

In a preferred form of our process magnetic concentrate from the Syd-Veranger mine was ground so that at least 50% passed through a 200 mesh Taylor screen and this was mixed with finely ground Longyear coal from Spitzbergen (at least 50% through a 200 mesh Taylor screen) in a proportion corresponding to approximately 175 parts fixed carbon per 950 parts Fe. These finely ground ingredients were mixed with 5% Portland cement in the dry state in a concrete mixer and then pelletized on a saucer type pelletizer of about 1.5 m. in diameter on which the charge was sprayed with sufficient water to bring its moisture up to about 10%. The pellets were produced at the rate of approximately 100 kg. per hour and had a diameter from 10 to 25 mm. These pellets had the strength indicated in the last line of the above table.

It is to be understood that the strength value after heating is given to show that they would not disintegrate during use but actually the pellets were used after a few days' storage without any special sintering step as the heating took place during normal use.

Charge pellets made in accordance with this invention can be treated in one or more shafts placed directly above the furnace or in a rotary kiln from which the hot charge is transferred to the smelting furnace by means of insulated containers. The use of charge pellets for electric furnaces presents great advantages compared with the conventional process where ore, sinter, fluxes and coke are smelted. Charge pellets contain the main constituents of the charge, ore and coal, the latter being transformed to coke in the usual operation of a prereduction furnace. The cement which is added will wholely or partly cover the demand for fluxes. In many cases it will be economical to use Portland cement as a binding agent as the charge will thereby receive an excess of lime. With some iron ores poor in $Al_2O_3$ it is, however, an advantage to use Al-cement for at the same time to add Al-oxide to the charge. The invention therefore also has the advantage that the binding agents used take their natural part in the process as fluxing and reducing agents.

It is to be understood that the examples given are indicated only by way of illustration to show our preformed method of carrying out the invention and that the same may be modified in many particulars.

What is claimed is:

1. The process of producing charge pellets characterized by the fact of having a point pressure strength initially of at least 3 kg. and, upon three days' storage, of at least 15 kg., and further characterized by the fact that upon heating of the pellets to 700° C. the point pressure strength thereof increases substantially, which comprises the steps of mixing together finely divided charge material which can be reduced with carbon and which is selected from the group consisting essentially of iron oxide, iron oxide combined with alloying ingredients and calcium compounds, with a finely divided bituminous binding agent having an effective swelling index of at least 4.5 and comprising in major part finely-divided coal, mixing into the mixture so formed from about 3% to about 10% by weight of a water-activatable hydraulic cement and then pelletizing the final mixture with the aid of water.

2. A process in accordance with claim 1 in which the bituminous binding agent comprises an admixture of finely divided crude coal having a swelling index of about 3 to less than 4.5 and from 0.5 to 2% pitch, the admixture having an effective swelling index of at least 4.5

3. A process in accordance with claim 1 in which about 10% of water is added to the final mixture during pelletization thereof.

4. A process in accordance with claim 1 in which the bituminous binding agent comprises crude coal having a swelling index of at least 8.

5. A charge pellet characterized by the fact of having a point pressure strength initially of at least 3 kg. and, upon three days' storage of at least 15 kg., and further characterized by the fact that upon heating of the pellets to 700° C. the point pressure strength thereof increases substantially, which comprises a pelletized admixture of finely divided charge material which can be reduced with carbon and which is selected from the group consisting essentially of iron oxide, iron oxide combined with alloying ingredients and calcium compounds, finely divided bituminous binding agent having an effective swelling index of at least 4.5 and comprising in major part finely-divided coal and from about 3% to about 10% by weight of a water-activatable hydraulic cement.

6. A pellet in accordance with claim 5 in which the bituminous binding agent comprises an admixture of crude coal having a swelling index from about 3 to less than 4.5 and from about 0.5 to about 2% of pitch, said admixture having an effective swelling index of at least 4.5.

7. A pellet in accordance with claim 5 which includes about 10% of water.

8. A pellet in accordance with claim 5 in which the water-activatable hydraulic cement contains a substantial amount of aluminum oxide.

9. A process in accordance with claim 1 in which the amount of said bituminous binding agent is sufficient to supply the carbon required for reducing said charge material.

10. A pellet in accordance with claim 5 in which the amount of said bituminous binding agent is sufficient to supply the carbon required for reducing said charge material.

References Cited in the file of this patent

UNITED STATES PATENTS

| 833,005 | Steinberg | Oct. 9, 1906 |
| 1,334,331 | Vogel | Mar. 23, 1920 |
| 1,896,088 | Kern | Feb. 7, 1933 |
| 2,405,278 | Vance | Aug. 6, 1946 |
| 2,808,325 | Subervie | Oct. 1, 1957 |
| 2,918,364 | Lesher | Dec. 22, 1959 |

FOREIGN PATENTS

| 3,314 | Great Britain | 1876 |
| 265 | Great Britain | 1877 |